United States Patent Office 3,046,246
Patented July 24, 1962

3,046,246
RESINOUS REACTION PRODUCT COMPRISING A COPOLYMER OF AN UNSATURATED DICARBOXYLIC ACID ANHYDRIDE AND AN OLEFINIC COMPOUND, AND AN ALIPHATIC POLYHYDRIC ALCOHOL, AND A MOLDING COMPOSITION COMPRISING SAME AND A PLASTICIZER

Irving E. Muskat, Miami, Fla., assignor, by mesne assignments, to Texas Butadiene & Chemical Corporation, a corporation of Delaware
No Drawing. Filed Jan. 23, 1958, Ser. No. 710,624
25 Claims. (Cl. 260—30.4)

The present invention relates to molding compositions. More particularly, it relates to molding compositions comprising polymers prepared by reaction of unsaturated dibasic acid anhydrides and olefins, a polyhydric alcohol, and a reactive plasticizer having an oxirane group. Preferably, it relates to a low pressure molding composition comprising a solid, linear, low molecular weight heteropolymer of maleic anhydride and styrene, said polymer having been prepared in an aromatic solvent in which the carbon atom of the ethyl group in the beta position relative to the benzene ring is substituted only by hydrogen and the alpha carbon has at least one hydrogen atom attached thereto, a polyhydric alcohol, especially a solid polyhydric alcohol and a reactive plasticizer having at least one oxirane group.

Low pressure molding compositions which are readily fusible during the forming and liquefaction stages of heating and which can be thermoset to cross-linked infusible products by high speed modern molding production methods have long been sought in the trade. Particularly in the commercial manufacture of large molded products such as tanks, cabinets, furniture, boats, auto bodies, etc., the molding procedures have been restricted because of the limitations inherent in the materials available to the industry.

The use of the older thermosetting resins such as urea-formaldehyde, melamine-formaldehyde and phenol-formaldehyde resins, have been limited due to the high pressures required to mold them. The newer, low pressure allyl and polyester resins are limited in use because the methods of fabrication suitable for these low pressure resins are slow and time consuming.

Low pressure resins of the allyl and polyester types are essentially liquid polymerizable, unsaturated casting resins in which the catalytic polymerization of these resins takes place in the mold, preferably at a low temperature and over a long period of time, to obtain optimum physical properties and freedom from defects such as air bubbles, blisters, drainage, cracks, etc.

The problem of the plastics industry has been that high speed methods, i.e., compression, injection and transfer molding, have been developed for the high pressure resins. What has been sought is the development of a low pressure resin for which the already known and established high speed methods of molding are applicable. In general, the copolymers and heteropolymers of unsaturated dibasic acid anhydrides and olefins of the prior art have not been considered to be desirable for use in molding compositions because of the excessive pressure requirements and poor flow characteristics of the compositions even at high pressures. Because of the incompleteness of the cross-linking reaction, such molded products, as were obtained, had a high proportion of free anhydride groups and a low degree of cure, both of which factors contributed to poor chemical resistance properties.

In accordance with the present invention it has been found that the inclusion of a reactive plasticizer having at least one oxirane group in a molding mixture improves flow of the molding composition, provides better wetting of fiber fillers and induces a tighter cure. A reactive plasticizer of this type brings about in situ cross-linking of reactive components under low pressure, i.e., molding conditions of 10 to 100 pounds per square inch, and at temperatures of about 120° C. to 200° C.

Copolymers and heteropolymers of olefinic compounds are particularly suitable for use in the formulation of solid or pasty low pressure molding compositions, particularly when the composition contains a polyhydric alcohol as well as an oxirane as the reactive cross-linking reagents.

Solid polymer or resin ingredients used with the present invention may be any of the products of reaction of unsaturated dibasic acid anhydrides and olefins. Useful unsaturated dibasic acid anhydrides are such as maleic anhydride, chlormaleic anhydride, citraconic acid anhydride and the like. The preferred form of anhydride has the general formula

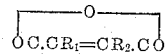

where $R_1$ represents a hydrogen atom or halogen atom or a hydrocarbon radical which may or may not be substituted by halogen, oxygen, nitrogen, etc. atoms, and $R_2$ may be a hydrogen atom or a halogen atom.

Useful olefins are those having the general formula

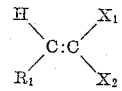

where $R_1$ represents a hydrogen atom or a hydrocarbon radical selected from the group of alkyl and unpolymerizable alkene radicals which may or may not be substituted by halogen, oxygen, nitrogen, etc. atoms, and where $X_1$ and $X_2$ may be an activating atom or radical selected from the group consisting of hydrogen atom, halogen atom, and alkoxy, aryloxy, alkaryloxy groups and acetyl, alkyl, substituted alkyl, alicyclic, substituted alicyclic, aromatic and nuclear hydrogen substituted aromatic radicals.

The preferred form of olefins are those having a single double bond and the general formula

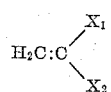

where $X_1$ and $X_2$ are activating atoms of the types described in the general formula above. Such monoolefins are illustrated by the compounds, for example, vinyl halides, vinyl ethers, vinyl acetate, vinyl naphthalene, styrene, alkyl styrenes, and halogen substituted styrenes in which two to five of the nuclear hydrogen atoms are replaced by halogen and the like. The preferred form of resin ingredient is the heteropolymer of styrene and maleic anhydride produced in an aromatic solvent in the which the carbon atom of the group in beta position relative to the benzene ring is substituted only by hydrogen and the alpha carbon has at least one hydrogen atom attached thereto, for example, ethylbenzene or cumene. The molar ratio of styrene to maleic anhydride in the solvent may vary from about 1:2 to about 2:1. The heteropolymers of this type have been described and claimed in my copending application Serial No. 637,890, filed February 4, 1957. Preferably, the polymerization with benzoyl peroxide as the catalyst is carried out at a temperature of about 80° C. to 125° C., a temperature below the reflux temperature of the solvent, to produce a precipitated heteropolymer in which polymer the ratio of styrene to maleic anhydride is substantially 1:1.

As indicated in said copending application, the polymers of styrene and maleic anhydride which are particularly adapted for molding at low pressure are of low molecular weight as indicated by low solution viscosity in acetone. More particularly, the solution viscosity of a 10% by weight solution of the polymer dissolved in pure acetone may be up to substantially 27 seconds in comparison with acetone per se at 19 seconds. The solution viscosity value reported in seconds is, therefore, a comparative viscosity value, the viscosity being measured by timing the descent of a standard glass spherical "tear drop" through the solution of the polymer contained in a standard glass tube having a length of 37¾" and an inside diameter of 5/16", the glass "tear drop" having a diameter slightly less than the internal diameter of the tube. The temperature is controlled at 25° C.

While the preferred form of resin is the heteropolymer of styrene and maleic anhydride described above, copolymers of any of the olefins and unsaturated carboxylic acid anhydrides described earlier may be used advantageously. In these copolymers, preferably copolymers of styrene and maleic anhydride, the molar ratio of olefin to carboxylic acid anhydride may vary over wide limits, i.e. 97:3 to 3:97 on a molar basis. Copolymers containing major proportions of styrene, i.e. 99:1 to 55:45 styrene-maleic anhydride may be prepared according to the published method of A. W. Hanson and R. L. Zimmerman, Industrial and Engineering Chemistry, 49, 1803–1806 (1957). In some cases, the use of a styrene-maleic anhydride copolymer containing a plurality of styrene results in a less brittle molded product.

Resins, useful in the present invention, may also have incorporated therein, small amounts, i.e., 1 to 20% of a third comonomer into the polymer, such as acrylonitrile, acrylate and methacrylate esters, vinyl acetate, and especially mono and dialkyl esters of maleic acid as, for example, 2 ethylbenzyl hydrogen maleate and dimethyl maleate. The latter comonomers especially are able to exert an internal plasticizing effect upon the final molded product which is permanent in nature and not fugitive, being an integral part of the molecule.

These cumene and ethylbenzene solution-polymerized maleic anhydride-styrene heteropolymers when used as components of relatively low pressure molding compositions have excellent flow characteristics. These heteropolymers lend themselves for use in compositions which can be molded at low pressures markedly in contrast with the unsatisfactory molding properties hitherto experienced with the polymers produced by maleic anhydride and styrene of the prior art, which prior art resins required pressures for molding usually exceeding 1000 pounds per square inch.

In the admixture of the separate reactive components it is preferable that the cross-linking agents and polymer be stable and inert towards each other during ordinary storage for extended periods of time, otherwise a two-step addition process is necessary. At elevated temperatures during molding, the fusing of the lower melting component and the solubility of components in each other provide a mobile liquid at very low pressures to completely fill the mold cavity or form. These ingredients being soluble in the molten state with each other, flow readily while at the same time they are undergoing a controlled rapid resinification reaction to form a thermoset infusible product of highly desirable physical and chemical properties and which is substantially uniform throughout all portions of the formed molded product.

The in situ reactive molding composition of the present invention containing, for example, a styrene-maleic anhydride heteropolymer is rapidly cured by cross-linking of the heteropolymer with a glycol component and an oxirane component, yet is free from the evolution of volatile components or products of reaction during molding. The molding resin composition is readily subjected to compression or transfer molding by the usual standard methods.

While standard high pressure equipment, and molds designed for low pressure polyester resins (in place of costly high pressure molds) can be used, the new molding compositions of this invention lend themselves to molding by conventional compression and transfer methods to form molded products which, surprisingly, may have a surface area of 20 to 100 times that possible when phenolic or urea resins are molded.

Conversely, by using the molding compositions of this invention, simple inexpensive air cylinder presses and low cost tooling may be used to mold the normally manufactured plastic products, which now require heavy duty and expensive hydraulic presses and high pressure molds.

In accordance with the present invention there is provided a stable, uniform admixture of polymer together with a polyhydric alcohol cross-linking reactant and a reactive plasticizer having an oxirane group.

Polymers prepared in accordance with varying procedures exhibit different characteristics such as viscosity, bulk density, etc. Heteropolymers for example produced in benzene are higher in viscosity and lower in bulk density than corresponding polymers produced in cumene. Polymers prepared in toluene when mixed with equal molecular proportions of polyhydric alcohol cross-linking agent, such as ethylene glycol, and heated to about 150° C. to 225° C., require 250 pounds per square inch pressure for molding. A corresponding resin prepared in benzene requires a pressure in excess of 1500 pounds to produce sufficient flow to fill the mold. On the other hand, the corresponding molding composition, produced from polymer prepared in cumene, flows to completely fill the same mold at pressures of 40 to 100 pounds per square inch at a temperature of 130° to 200° C. It is assumed that subsequent to fusion of the mixture, the polyhydric alcohol cross links, in a condensation reaction to neighboring linear chains of the heteropolymer.

The polyhydric cross-linking reactant is preferably an aliphatic glycol which contains at least one primary hydroxyl group. Employing polyhydric alcohols containing only secondary hydroxyl groups, for example, 2,3-butylene glycol, the rate of cross-linking is slower because the alcohol is more inert. This inertness can be compensated for by higher molding temperatures or a longer molding cycle or by accelerating the rate of cure by means of catalysts both in the absence and presence of an oxirane, preferably alkaline catalysts such as sodium hydroxide, potassium hydroxide, magnesium oxide, sodium acetate, calcium acetate, etc., and acidic catalysts such as aluminum chloride. Even neutral salts such as sodium iodide and potasium chloride have been found effective catalysts for such reactions both in the presence and absence of oxiranes.

It has been found that aliphatic polyhydric alcohols which are solid at temperatures of about 15° C. or higher, possess sufficient inertness towards the polymer ingredient to satisfy the requirements for mixing the composition as by ball milling and storage for extended periods of time at room temperature and up to about 40° C. The solid alcohol must also be sufficiently reactive during molding operations to permit controlled fast cure within a reasonable temperature range of about 120° to 200° C.

Cross-linking of the polyhydric alcohol and polymer may take place without any appreciable induction period and almost as soon as the components begin to fuse and flow together. The rate of cross-linking which occurs depends upon the ease of fusibility of the molding composition at the selected temperature and upon the reactivity of the polyhydric alcohol toward the polymer.

Such polyhydric alcohols as 1,4-butanediol react so fast in the cross-linking reaction that it is desirable to close the mold rapidly to insure that the composition has been flowed and shaped to the desired extent before irreversible solidification and sintering due to cross-linking takes place. In this case, it is desirable to lower the temperature (110° C. is feasible) to provide a slower rate of cross-linking consistent with good fusion and flow of the intermingled ingredients to produce good results. This alcohol thus provides a fast molding cycle and care is needed to avoid producing a sintered rather than a fused molded product.

Other glycols react somewhat slower. Thus ethylene glycol cross-links at a moderate rate in comparison with 1,4-butanediol. Such glycols as trimethylol ethane, trimethylol propane, neopentyl glycol, propylene glycol, diethylene glycol, polypropylene glycols, polyethylene glycol, 1,5-pentanediol, polyvinyl alcohol and hexylene glycol (2-methyl-2,4-pentanediol) cross-link with the polymer at a rate which is less than that of 1,4-butanediol and greater than that of 2,3-butanediol.

It has been found that liquid hydroxy compounds containing a primary hydroxyl group such as ethylene glycol and its polyglycols having up to 10 glycol units, propylene glycol and its polyglycols with up to 10 glycol units, 1,4-butanediol, glycerol, 1,5-pentanediol, etc., tend to react with styrene-maleic anhydride polymers at room temperature within 3–6 days and thus do not completely satisfy the high requirements for a one package system.

In contrast, a mixture of 2,3-butylene glycol and the styrene-maleic anhydride copolymer prepared in an ethylbenzene solvent is stable for several months at room temperature but reacts slowly at molding temperature.

More reactive cross-linking alcohols may be used in accordance with the invention by blending the ingredients in accordance with the invention just prior to carrying out the low pressure molding operation. This two-step operation of blending and molding is suitable for some but not all operations.

For a two-step operation wherein a resin and oxirane compound are premixed and the polyhydric alcohol is added just prior to use, a formulation including an alcohol of the type represented by 1,4-butanediol may be preferred.

To satisfy the stringent commercial requirements for a single package molding composition, which is inert at ordinary temperatures and which is capable of storage for prolonged periods, it is necessary to balance the opposing factors of high cross-linking rate with good flow at elevated temperatures above the fusing temperature of the composition with the reactivity of the alcohol toward the polymer at ordinary temperatures. This balance is attained by such polyhydroxy cross-linking reactants as trimethylol ethane, trimethylol propane and neopentyl glycol. Pentaerythritol requires a very high temperature for fusibility and can be used.

All of the above-mentioned glycols, their homologues and analogues, or mixtures of these glycols, are effective co-reactive cross-linking ingredients in admixture with the polymers described herein, to provide useful and commercially desirable, infusible molded products by high-speed modern molding production methods at low pressures, below 1000 pounds per square inch, and at temperatures ranging from 130° C. to 225° C.

The polyhydric alcohol cross-linking reactants in admixture with the polymers does not produce a mixture sufficiently fluid at very low pressures of the order of 10 to 100 pounds per square inch to give the most satisfactory molded products. Addition of the plasticizer of the oxirane type increases the fusibility and fluidity of the composition under molding conditions of low pressure. In compositions, using glycol and oxirane compounds, the preferred ratio of functional groupings in the resin composition is: anhydride-1:hydroxyl-0.8 to 1.0: oxirane-0.5 to 2, with quantities of glycol and oxirane in the ratios of anhydride-1:hydroxyl-0.6 to 1.2: oxirane .4 to 3.0 being useful.

In the composition comprising a polymer of the types described, the reactive plasticizer in intimate admixture with the polyhydric alcohol serves as an auxiliary cross-linking reagent while lowering the temperatures and pressures at which the mixtures give proper flow in a mold.

The auxiliary cross-linking which is provided by the oxirane plasticizer markedly improves the physical properties, the uniformity, and the chemical and oxidative resistance of the molded product which has been prepared utilizing this reactive plasticizer.

The reactive plasticizers employed in accordance with the present invention are those which possess at least one oxirane group. If the compound possesses a single oxirane group it is preferable that the group be a terminal oxirane group but this is not necessary. Specifically, there may be only a single oxirane group as in the compound styrene oxide or there may be multiple oxirane groups as in the reaction product of 2,2'-bis-(p-hydroxyphenylpropane) and epichlorohydrin. The plasticizer may be monomeric or polymeric. The plasticizer may be a liquid or a solid at room temperature.

Oxirane plasticizers which are suitable for use in accordance with the invention are 1–2 oxirane compounds having the oxirane linkage in a terminal position of the plasticizer molecule. The oxirane plasticizers include mono-oxirane monomer reactants, di-oxirane polymer reactants and di-oxirane monomer reactants. The mono-oxirane monomer includes allyl glycidyl ether, phenyl glycidyl ether, styrene oxide, Cellosolve glycidyl ethers, epichlorohydrin, etc. Di-oxirane monomer reactants which may be employed include monomers of diglycidyl ethers of dihydric phenols such as those disclosed.

Polyepoxide resins are well known as such. We can use any of these resins containing recurring hydroxyether groups and terminal epoxy groups.

Other oxirane materials which may be employed are diglycidyl phthalate, diglycidyl maleate, diglycidyl oxalate, diglycidyl sebacate, 1,2-epoxyoctane, 2,3-epoxyoctane, dipentene oxide, epoxidized castor oil such as sold by Baker Castor Oil Company under the trade name "Estynox 308," epoxy acetoxide stearin, methyl epoxy hydroxy stearate, 1,2-epoxy octadecane, isobutylene oxide, and 1,2-butylene oxide.

Even oxiranes which have low boiling points or are gases, such as ethylene oxide and more particularly propylene oxide, can be used. It appears that such oxiranes are adsorbed or dissolved in the heteropolymer and can be molded at the usual temperatures without difficulty.

In general, the plasticizers are utilized in amounts as small at 5% by weight of the molding composition. The inclusion of the plasticizer effects a significant improvement in the flow characteristics of the resin composition during molding and, in general, the greater the amount of plasticizer used up to about 75 or more percent by weight, the greater the extent of flow experienced. The plasticizer presumably acts as a solvent for the resin and polyhydric alcohol reactants. This solvent action results in an initial high fluidity of the mix upon heating and a high degree of reaction between carboxylic acid anhydride and hydroxyl group with the oxirane plasticizer apparently keeping the reactants in solution for an indefinite period after cross-linking to a three dimensional network. This reaction of the heteropolymer, glycol and oxirane results in a low anhydride content of the final resin and high cures, both factors giving rise to improved chemical resistance properties. Further, the oxirane materials such as epichlorohydrin facilitate the wetting of laminating materials or fillers, for example, glass fibers or cloth, a factor important in obtaining laminate structures of high strength and good chemical resistance. In addition, oxirane plasticizers of the type above enumerated are not fugitive materials to be volatilized but react to become an integral part of the polymer molecule by means of chemical reaction with active hydrogen, i.e., alcoholic and carboxylic acid groups, and/or carboxylic anhydride groupings.

Such resin compositions as described above can be used to impregnate fibrous materials from solvents such as acetone, or without solvent by means of pressure and at a somewhat elevated temperature to permit easier flow and impregnation without advancing significantly the cure.

Such pre-impregnated materials are very useful in commercial molding operations.

In formulating the molding composition of the invention, fillers up to about 65% by weight may be added without impairing the molding characteristics. However, with fillers in an amount greater than 25% and up to 75% and more which are mixed with the molding powders, it may be necessary to employ higher pressures. Suitable fillers are calcium carbonate, clay, talc, asbestos, cotton floc, silica, wood flour, cellulose, milled and chopped glass fibers, etc. Other fillers which may function also as pigments may be used. Mixtures of the foregoing can also be used. In a specific application, if too much filler is used, it will be found that a higher pressure may be required for molding.

Lubricants, such as silicone oils, zinc stearates, aluminum stearates, etc., can be added to the molding composition of the invention, generally in amount of 1–5% by weight of the molding composition, in order to facilitate high-speed molding production.

The examples, showing the method of preparation of a styrene-maleic anhydride resin polymerized in ethyl benzene or cumene solvent, illustrate the preferred form of resin for use in the instant invention, but these polymerized products are only representative of the various polymers produced in solvents or not which can be utilized as the resin ingredient of the low pressure molding compositions comprising resin, polyhydric alcohol and oxirane compounds. The additional examples dealing with molding compositions are given by way of illustration and not by way of limitation. All parts and percentages are by weight.

EXAMPLE 1

Styrene-maleic anhydride heteropolymer used in the present invention and referred to hereinafter as St/Ma may be prepared as follows:

Maleic anhydride (147 grams) is dissolved in 1212 grams of technical grade ethyl benzene. If a cloudy precipitate is formed the solution is filtered. Styrene (156 grams) is then added along with 0.75 gram of benzoyl peroxide. The reaction is carried out in a round-bottom flask provided with an agitator, thermometer, and a reflux condenser. The solution is slowly heated with good agitation to 85° C. After an induction period of 10–15 minutes a cloud forms and precipitation increases along with the development of an exothermic reaction. As soon as the exothermic reaction has started the heat is removed from the reaction flask. Cooling may be used if necessary. When the exothermic heat has subsided, the mixture is heated to 105° C. and maintained at that temperature for three hours. The material is then cooled, filtered and dried. The yield is 99%.

EXAMPLE 2

A preferred method for producing the styrene-maleic anhydride heteropolymer of the present invention is as follows:

Maleic anhydride (147 grams) is dissolved in 1212 grams of cumene. Heating to 50° C. will speed the solution and help keep the maleic anhydride from crystallizing out of solution. If a cloudy precipitate is formed the solution is filtered (while hot). Styrene (156 grams) is then added along with 0.75 gram of benzoyl peroxide. The reaction is carried out in a round-bottom flask provided with an agitator, thermometer and a reflux condenser. The solution is slowly heated with good agitation to 85° C. After an induction period of 10–15 minutes, a cloud forms and precipitation increases along with the development of an exothermic reaction. As soon as the exothermic reaction has started the heat is removed from the reaction flask. Cooling may be used if necessary. When the exothermic heat has subsided, the mixture is heated to 105° C. and maintained at that temperature for three hours. The material is then cooled, filtered and dried. The yield is 97%.

The polymerization reaction is highly exothermic. Unless the temperature is controlled there is danger of a "runaway reaction." It is necessary that the heat evolved in the reaction mixture be removed substantially as soon as it is evolved. Efficient agitation of the reaction mixture aids in separating the polymer from any monomer which may be present therein and prevents the swelling of precipitated polymer by occluded or imbibed solvent.

To facilitate uniformity of the physical and chemical characteristics of the polymer, it is preferred to use a molar excess of up to about 5% of styrene relative to the maleic anhydride and such excess may be recycled in the preparation of subsequent batches. The preparation may be carried out by batch methods or utilizing known engineering practice, continuously or semi-continuously.

Ethylbenzene prepared polymer of Example 1 was mixed thoroughly with glycol as shown below. The mixture was ball milled for about four hours to provide a homogeneous solid mix. This mix was molded without plasticizer with the following results:

(a) 100 parts St/Ma+26 parts neopentyl glycol— molded at 180° C. 100 p.s.i.—completely fused. Barcol hardness—40–45.

(b) 100 parts St/Ma+30 parts trimethylol ethane— molded at 170° C. 790 p.s.i.—fused and translucent. Barcol hardness—50–55.

In the table which follows are listed the test results of a number of molding compositions including various oxiranes. The specific formulation is given under "composition" in the first horizontal row.

*Table*

| Comp. | 100 Resin, 26 Neopentyl glycol, 15 Phenyl glycidyl ether | 100 Resin, 26 Neopentyl glycol, 50 Styrene oxide | 100 Resin, 22 Trimethylolethane, 74 Phenyl glycidyl ether | 100 Resin, 26 Neopentyl glycol, 20 Epichlorohydrin |
|---|---|---|---|---|
| H₂O | +1% | +0.9% | +0.7% | 2.4% |
| H₂O₂(3%) | +1% | +0.9% | +0.7% | |
| NaCl(10%) | +1% | +0.8% | +0.6% | |
| NaOH(1%) | +7% | +6% | +2.0% | |
| NaOH(10%) | D | +34.8% | +8% | ¹ 0 |
| H₂SO₄(3%) | +1% | +1% | +0.7% | 1.7% |
| H₂SO₄(30%) | +0.6% | +0.6% | +0.3% | |
| HCl(10%) | +0.8% | +0.7% | +0.4% | |
| HNO₃(10%) | +1% | +0.8% | +0.3% | |
| Acetic Acid (5%) | +1% | +1% | +0.7% | 2.2% |
| Phenol (5%) | +5% | +4% | +4% | 9.1% |
| Barcol Hardness | 40–45 | 40–42 | 44–46 | 45–59 |
| Molding condition, temp./° C., Pressure p.s.i. | 180/50 | 180/20 | 180/20 | 180/20 |

¹ Delaminated.

Epoxy cross-linking catalysts need not be used to enhance the reactivity of the most reactive oxirane compounds such as styrene oxide, although their use may be permitted. However, for less reactive (toward anhydrides) oxiranes such as epichlorhydrin, octylene oxide, etc., the use of catalysts are definitely advantageous. Suitable catalysts may be of the acid, neutral or alkaline type. Illustrative of the acid type are the Friedel-Crafts type catalysts such as ferric chloride, aluminum chloride, stannic chloride and boron trifluoride complexes of the ether oxygen or amine nitrogen type. Alkaline type catalysts are sodium and potassium hydroxides, alkaline earth oxides, hydroxides and carbonates such as magnesium oxide, quaternary ammonium hydroxides as well as the ether bases such as alkali and alkaline earth metal salts of carboxylic acids, amines, and alkaline reacting substances in general. Typical of the amine type basic catalysts are benzyl dimethyl amine, triethylene tetramine, piperidine and the like. Neutral salt catalysts are sodium iodide, sodium bromide, potassium bromide, potassium chloride, cesium chloride and the like.

The epoxy catalysts are used in small amounts of about 0.1% to about 20% by weight based on the epoxide modifier employed in the resin system.

It is to be noted that the use of oxirane type plasticizers in resin systems of the styrene-maleic anhydride-glycol type makes possible the use of styrene-maleic anhydride polymer prepared in almost any solvent, e.g., benzene, toluene, naphtha, cumene and the like and in the absence of solvents, that is in bulk polymerization or employing styrene as the solvent as in the method of Hanson and Zimmerman, referred to previously. Heretofore styrene-maleic anhydride resin prepared in solvents such as benzene have required pressures for molding which rendered the resin useless for low pressure systems. Now by the incorporation of oxirane type plasticizers, the flow of resin mixtures is such at low pressures and temperatures as to yield moldings which are completely fused and of better chemical resistance. Employment of the styrene-maleic anhydride resin prepared in an ethyl benzene or cumene type hydrocarbon solvent is preferred, however, as a much higher order of flow of the resin composition is obtained.

As previously indicated, the glycol component is generally used in equimolar quantity with respect to the anhydride grouping present in the styrene-maleic anhydride polymer. This is also true when oxirane-type plasticizers are used. However, the proportion of polyhydric alcohol used can be varied over rather wide limits without detracting from the flow or chemical properties of the molded composition, i.e., polyhydric alcohol can be varied from about 50% to 150% of the theoretical amount of, for example, glycol necessary for reaction with all of the anhydride groups present on the basis of 1 anhydride to 1 hydroxyl group. In general, it has been found that the oxirane plasticizer can function as cross-linking agent as well as the plasticizer in the presence of or in the absence of polyhydric alcohol, i.e., molding compositions can be prepared from, for example, styrene-maleic anhydride heteropolymer and styrene oxide as well as with epichlorohydrin, particularly in the latter case in the presence of a catalyst as mentioned above. The flow properties and chemical resistance properties of the resulting molding compositions in the complete absence of polyhydric alcohol under proper conditions and proportions have been found to be adequate for processing under low temperature-low pressure operating conditions.

In any event a minimum of 10 parts by weight of oxirane to 100 parts by weight of styrene maleic anhydride resin should be used. In general, excessive amounts of either glycol or oxirane or the combination thereof should be avoided since the chemical and physical properties of the molded products are adversely affected thereby. For most purposes a practical upper limit for the oxirane alone is 150 parts of oxirane to 100 parts of styrene-maleic anhydride resin, except for polymerized epoxy compounds when higher quantities even in excess of 300 parts of oxirane to 100 parts of styrene-maleic anhydride may be used.

Of the plasticizers tested styrene oxide, phenyl glycidyl ether and epoxy resins such as those made from bisphenol A and epichlorohydrin, and epichlorohydrin gave the better results. Epichlorohydrin especially was found to provide excellent flow of the resin mixture as well as providing excellent wetting of glass mat fibers and cloth used as laminating or strength producing materials.

Although the invention has been described in connection with specific embodiments thereof, it will be understood that these are not to be regarded as limitations upon the scope of the invention except insofar as included in the accompanying claims.

I claim:

1. A molding composition adapted for molding under pressure at temperatures of about 120° C. to about 210° C., comprising a mixture of (A) a resin ingredient consisting of a solid copolymer produced by the copolymerization of unsaturated dicarboxylic acid anhydride having the general formula

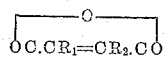

wherein $R_1$ represents a member selected from the group consisting of hydrogen, halogen, hydrocarbon radical and substituted hydrocarbon radical, and $R_2$ is selected from the group consisting of halogen and hydrogen atoms, and olefinic compound having the general formula

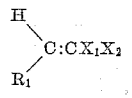

where $X_1$ and $X_2$ represent activating atoms selected from the group consisting of hydrogen, halogen, alkoxy, aryloxy, alkaryloxy, acetyl, alkyl, substituted alkyl, alicyclic, substituted alicyclic, aromatic and nuclear hydrogen substituted aromatic radical, and $R_1$ is selected from the group consisting of hydrogen and alkyl radicals, (B) aliphatic polyhydric alcohol which is reactive in situ with said copolymer during molding to provide a thermoset cross-linked polymer and (C) at least 5% by weight of the molding composition of reactive plasticizer selected from the group consisting of monomeric organic oxirane compounds containing at least one oxirane group and polymers which are polyglycidyl ethers of polyhydroxy organic compounds, said copolymer containing anhydride groups as the sole functional group reactive with the hydroxyl groups of said aliphatic polyhydric alcohol and with the oxirane group of said reactive plasticizer.

2. A molding composition as claimed in claim 1 wherein said polyhydric alcohol is trimethylol ethane.

3. A molding composition as claimed in claim 1 wherein said polyhydric alcohol is neopentyl glycol.

4. A molding composition as claimed in claim 1 wherein said polyhydric alcohol is 1,4-butanediol.

5. A molding composition as claimed in claim 1 wherein said reactive plasticizer is styrene oxide.

6. A molding composition as claimed in claim 1 wherein said reactive plasticizer is phenyl glycidyl ether.

7. A molding composition as claimed in claim 1 wherein said reactive plasticizer is epichlorohydrin.

8. A molding composition as claimed in claim 1 wherein said reactive plasticizer is an epoxide resin constituted by the reaction product of 2,2′-bis-(p-hydroxyphenylpropane) and epichlorohydrin.

9. A molding composition as recited in claim 1 in which said composition includes a neutral salt catalyst.

10. A molding composition as recited in claim 9 in which said neutral salt catalyst is sodium iodide.

11. A molding composition as recited in claim 1 in which said composition includes an alkaline earth metal oxide catalyst.

12. A molding composition as recited in claim 1 in which said components (A), (B), and (C) are present in quantities providing a molar ratio of functional groupings within the range of anhydride 1:hydroxy 0.6 to 1.2:oxirane 0.4 to 3.0.

13. A molding composition adapted for molding under pressure at temperatures of about 120° C. to about 210° C., comprising a mixture of (A) a resin ingredient consisting of a solid copolymer produced by the copolymerization of styrene and maleic anhydride, (B) aliphatic polyhydric alcohol which is reactive in situ with said copolymer during molding to provide a thermoset cross-linked polymer, and (C) at least 5% by weight of the molding composition of reactive plasticizer selected from the group consisting of monomeric organic oxirane compounds containing at least one oxirane group and polymers which are polyglycidyl ethers of a polyhydroxy phenol, said copolymer containing anhydride groups as the sole functional group reactive with the hydroxyl groups of said aliphatic polyhydric alcohol and with the oxirane group of said reactive plasticizer.

14. A molding composition as recited in claim 13 in which said solid copolymer is constituted by styrene and maleic anhydride in substantially equimolar proportions.

15. A molding composition as recited in claim 13 in which said polyhydric alcohol contains at least one primary hydroxyl group.

16. A molding composition as recited in claim 13 in which said polyhydric alcohol is solid at room temperature.

17. A molding composition as recited in claim 13 in which said components (A), (B), and (C) are present in quantities providing a molar ratio of functional groupings within the range of anhydride 1:hydroxyl 0.8 to 1.0:oxirane 0.5 to 2.0.

18. A molding composition adapted for molding at temperatures of about 120° C. to about 210° C. and at pressures ranging from about 10 to 100 pounds per square inch comprising a mixture of (A) a resin ingredient consisting of a solid copolymer of styrene and maleic anhydride having a viscosity measured at 25° C. in a 10% by weight solution in pure acetone of up to substantially 27 seconds in comparison with acetone having a viscosity of 19 seconds, (B) aliphatic polyhydric alcohol which is reactive in situ with said copolymer during molding to provide a thermoset cross-linked polymer, and (C) at least 5% by weight of the molding composition of reactive plasticizer selected from the group consisting of monomeric organic oxirane compounds and polymers which are polyglycidyl ethers of a polyhydroxy phenol said copolymer containing anhydride groups as the sole functional group reactive with the hydroxyl groups of said aliphatic polyhydric alcohol and with the oxirane group of said reactive plasticizer.

19. A molding composition as recited in claim 18 in which said components (A), (B), and (C) are present in quantities providing a molar ratio of functional groupings within the range of anhydride 1:hydroxyl 0.8 to 1.0:oxirane 0.5 to 2.0, and said copolymer contains styrene and maleic anhydride in substantially equimolar proportions.

20. A molding composition as recited in claim 19 in which said polyhydric alcohol is a solid having at least one primary hydroxyl group.

21. The resinous reaction product produced by reacting at temperatures of about 120° C. to about 210° C. a mixture of (A) a resin ingredient consisting of a solid copolymer produced by the copolymerization of unsaturated dicarboxylic acid anhydride having the general formula

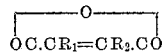

wherein $R_1$ represents a member selected from the group consisting of hydrogen, halogen, hydrocarbon radical and substituted hydrocarbon radical, and $R_2$ is selected from the group consisting of halogen and hydrogen atoms, and olefinic compound having the general formula

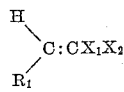

where $X_1$ and $X_2$ represent activating atoms selected from the group consisting of hydrogen, halogen, alkoxy, aryloxy, alkaryloxy, acetyl, alkyl, substituted alkyl, alicyclic, substituted alicyclic, aromatic and nuclear hydrogen substituted aromatic radical, and $R_1$ is selected from the group consisting of hydrogen and alkyl radicals, (B) aliphatic polyhydric alcohol which is reactive in situ with said copolymer at said temperatures to provide a thermoset cross-linked polymer, and (C) at least 5% by weight of the mixture of reactive plasticizer selected from the group consisting of monomeric organic oxirane compounds and polymers which are polyglycidyl ethers of a polyhydroxy phenol, said copolymer containing anhydride groups as the sole functional group reactive with the hydroxyl groups of said aliphatic polyhydric alcohol and with the oxirane group of said reactive plasticizer.

22. A resinous reaction product as recited in claim 21 in which said copolymer is a copolymer of styrene and maleic anhydride.

23. A resinous reaction product as recited in claim 22 in which said copolymer contains substantially equimolar proportions of styrene and maleic anhydride and has a viscosity measured at 25° C. in a 10% by weight solution in pure acetone of up to substantially 27 seconds in comparison with acetone having a viscosity of 19 seconds.

24. A resinous reaction product as recited in claim 21 in which said components (A), (B), and (C) are reacted in quantities providing a molar ratio of functional groupings within the range of anhydride 1:hydroxyl 0.6 to 1.2:oxirane 0.4 to 3.0.

25. A molding composition according to claim 11 in which the alkaline earth metal oxide is magnesium oxide.

References Cited in the file of this patent

UNITED STATES PATENTS

| Re. 23,514 | Voss | June 24, 1952 |
| 2,530,983 | Minter | Nov. 21, 1950 |
| 2,839,490 | Grotz et al. | June 17, 1958 |